July 12, 1949. K. O. PETERSON 2,476,265
AUGER CONVEYER UNIT FOR HARVESTERS
Filed Sept. 25, 1946
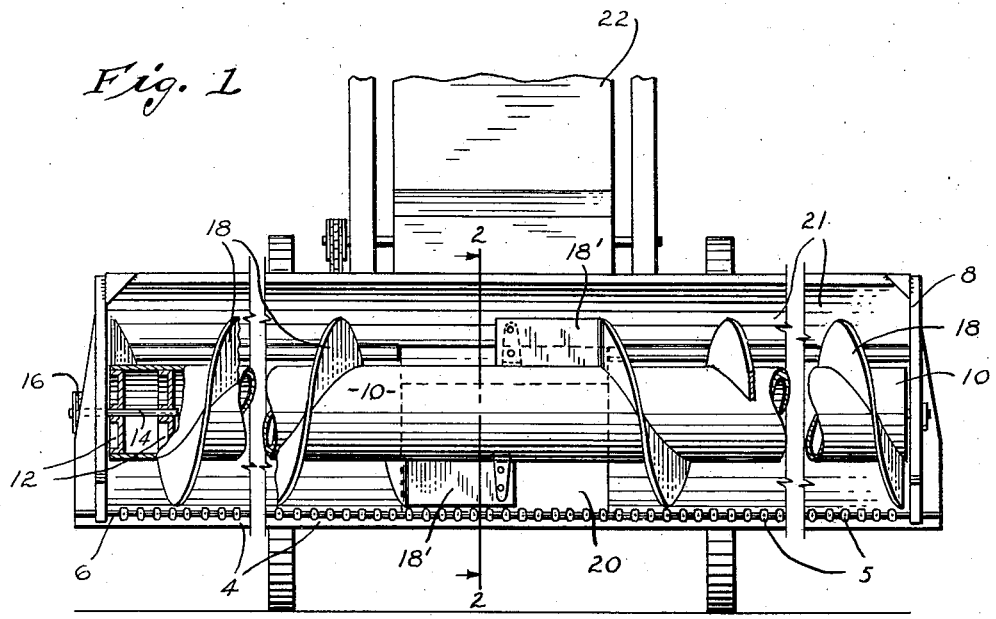
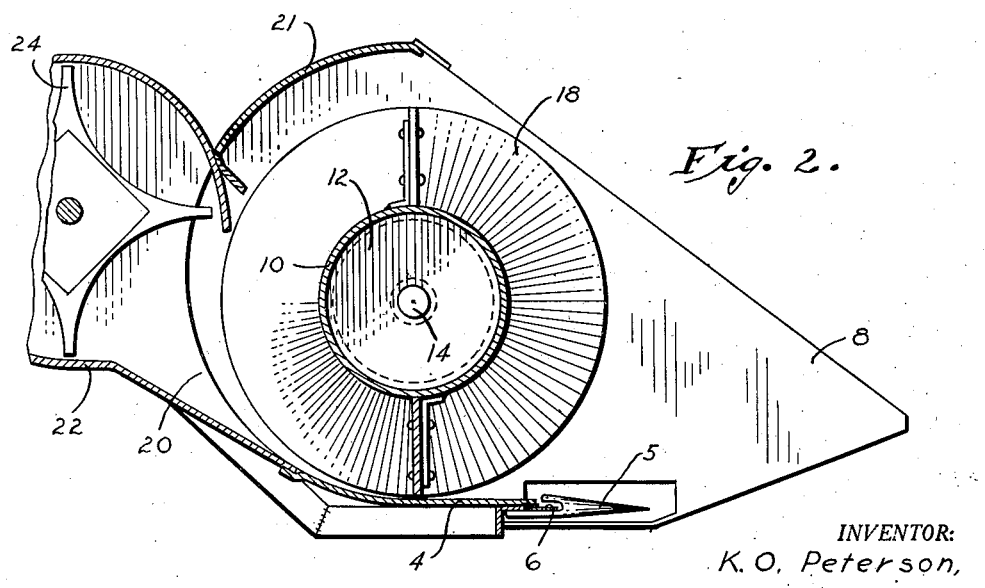
INVENTOR:
K. O. Peterson,
BY Chas. W. Gerard.
ATTORNEY Patented July 12, 1949

2,476,265

BEST AVAILABLE COPY

UNITED STATES PATENT OFFICE 2,476,265

AUGER CONVEYER UNIT FOR HARVESTERS

Karl O. Peterson, Kansas City, Mo., assignor of one-half to Vaughn H. Doyle, Leonardsville, Kans.

Application September 25, 1946, Serial No. 699,159

2 Claims. (Cl. 56—20)

The present invention relates to harvesting machinery, and aims to provide an improved arrangement of grain cutting mechanism and conveyor means for the cutting and conveying unit of such equipment.

For carrying out this purpose of the invention I have devised an assembly making use of right and left auger conveyor sections feeding to a central point and eliminating any use of canvas belting or the like between said conveyor sections.

It is a further object of the invention to devise a design or arrangement of cutting and conveying means in such relation as to eliminate the necessity for the use of the usual grain reel mechanism, thus materially simplifying this part of the harvester equipment as well as reducing construction costs thereof.

For accomplishing this result I provide a grain auger construction designed not only to permit an efficient cutting action by means of a direct application of the grain to the sickle bar but also for effectively counteracting any tendency of the grain to wrap about the conveyor and thereby choke the feeding action.

Further minor objects of the invention will be pointed out in the course of the detailed specification.

With the foregoing general objects in view, the invention will now be described by reference to the accompanying drawing illustrating one form of construction which has been found adapted for the efficient embodiment of the proposed improvements, after which those features and combinations deemed to be novel and patentable will be particularly set forth and claimed.

In the drawing—

Figure 1 is a front elevation illustrating a portion of the cutting and feeding mechanism of a harvester apparatus and embodying an assembly constructed in accordance with the present invention; and Figure 2 is a transverse sectional view, representing a section taken on the line 2—2 of Figure 1.

Referring now to the accompanying drawing in detail, the improved cutting and feeding unit or assembly is illustrated as comprising an auger construction composed of right and left auger elements adapted to feed the cut grain in opposite directions, that is, from the opposite ends of the grain cutting platform 4 which carries the usual sickle bar or cutting mechanism and the grain divider members 8. In the present construction I employ a central auger shaft of relatively large diameter, such as a hollow cylinder 10, the ends of which are provided with internal disks 12 for connecting with drive shaft elements 14, one of which is provided with conventional drive connections as indicated at 16 in Figure 1.

The right and left spiral conveyor flights 18 which are carried by the auger cylinder shaft 10 are of correspondingly smaller diameter as compared with the diameter of said shaft, and the auger unit is so mounted, relative to the grain platform 4, that the maximum forward projection of said conveyor flights 18 is approximately vertically above the middle portions of the guard teeth 5 of the sickle bar or cutting mechanism 6, as represented in Figure 2.

Heretofore, in auger feeding devices, feeding from opposite directions, the same have been arranged to discharge upon a belt conveyor at the middle of the grain cutting unit. In the present construction I provide the inner ends of the spiral conveyor flights 18 with straight longitudinally extending terminals 18' in coplanar relation at opposite sides of the axis of the cylinder shaft 10, and projecting also in slightly overlapping relation (i. e., past the middle of the grain platform), as illustrated in Figure 1. These inner overlapping terminals of the auger sections are located directly opposite a discharge or outlet opening 20 in the auger casing or housing 21 and through which opening the cut grain is delivered to the casing structure 22 for the feeder beater device 24 and other elements (not shown) which comprise parts of the feeder assembly.

By the provision of the relatively large auger shaft having spiral conveyor flights 18 of comparatively small diameter, I find that the usual tendency for the cut grain etc. to wrap about the auger conveyor and to cling thereto and thus choke the feeding action of the conveyor is very effectively counteracted and to a very practical degree eliminated; and also by locating the auger conveyor so that said flights project forwardly, directly over the cutting mechanism, no grain reel is found necessary for engaging and deflecting the grain into said cutting mechanism, since the grain is seized or gripped and propelled in an effective manner, simultaneously with the cutting action. Accordingly, a material saving is effected by virtue of the dispensing with such reel equipment.

Furthermore, with the improved auger design, it is unnecessary to carry the top of the casing or housing member 21, which encloses the auger assembly, so far forward as in prevailing types of construction, as I have found it sufficient to leave said casing or housing entirely open at the front and to locate the top edge thereof directly above the axis of the auger conveyor, as illustrated in Figure 2 of the drawing. This too effects a material saving in construction and material, without any sacrifice in the efficiency of the operation.

From the foregoing, therefore, it will be apparent that I have provided a practical and efficient arrangement and construction for carrying out the several desired objects of the invention, and while I have illustrated and described one practical form of embodiment of the improvements, I desire to be understood as reserving the right to make such changes or modifications as may fairly fall within the scope of the appended claims.

What I claim is:

1. A combination grain cutting and conveying assembly for harvesters comprising, a sickle bar cutting means, a pair of augers having central axles or shafts and spiral conveyor flights extending in spirally opposite directions and terminating in straight inner ends forming blade portions extending longitudinally of the shaft and in coplanar relation at the opposite sides thereof and with the inner margins or ends of the blade portions projecting in slight overlapping relation adjacent the mid portion of said shaft.

2. A combination grain cutting and conveying assembly for harvesters comprising, a sickle bar cutting means, a pair of single-flight augers having large central axles or shafts and narrow spiral conveyor flights extending in spirally opposite directions and terminating in straight inner ends forming blade portions extending longitudinally of the shaft and in coplanar relation at the opposite sides thereof and with the inner margins or ends of the blade portions projecting in slight overlapping relation adjacent the mid portion of said shaft.

KARL O. PETERSON.

REFERENCES CITED

The following references are of record in the file of this patent:

UNITED STATES PATENTS

| Number | Name | Date |
|---|---|---|
| 1,806,928 | Bartels | May 26, 1931 |
| 1,941,026 | Thoen | Dec. 26, 1933 |
| Re. 21,161 | Korsmo et al. | July 25, 1939 |
| 2,200,623 | James | May 14, 1940 |
| 2,212,465 | Baldwin | Aug. 20, 1940 |
| 2,312,785 | Welty | Mar. 2, 1943 |
| 2,426,922 | Carroll | Sept. 2, 1947 |